United States Patent
Barrus et al.

(10) Patent No.: US 10,466,871 B2
(45) Date of Patent: Nov. 5, 2019

(54) CUSTOMIZING TABS USING VISUAL MODIFICATIONS

(71) Applicant: MICROSOFT TECHNOLOGY LICENSING, LLC, Redmond, WA (US)

(72) Inventors: Adam Edward Barrus, Redmond, WA (US); Danielle Lauren Ellbogen, Seattle, WA (US); Marcus P. Ghaly, Kirkland, WA (US); Christopher Obeso, Duvall, WA (US); Andrew M. Pickard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/441,748

(22) Filed: Feb. 24, 2017

(65) Prior Publication Data
US 2018/0246624 A1    Aug. 30, 2018

(51) Int. Cl.
| | |
|---|---|
| *G06F 3/048* | (2013.01) |
| *G06F 3/0483* | (2013.01) |
| *G06F 16/955* | (2019.01) |
| *G06F 16/957* | (2019.01) |
| *G06F 3/0482* | (2013.01) |
| *G06F 3/0484* | (2013.01) |

(52) U.S. Cl.
CPC .......... *G06F 3/0483* (2013.01); *G06F 3/0482* (2013.01); *G06F 3/04845* (2013.01); *G06F 16/9562* (2019.01); *G06F 16/9577* (2019.01)

(58) Field of Classification Search
None
See application file for complete search history.

(56) References Cited

U.S. PATENT DOCUMENTS

| | | | | |
|---|---|---|---|---|
| 6,104,397 A | * | 8/2000 | Ryan | G06F 3/04817 715/846 |
| 8,375,321 B2 | * | 2/2013 | Cruz Moreno | G06F 16/957 715/777 |
| 9,032,309 B2 | | 5/2015 | Ainslie et al. | |
| 9,569,412 B1 | * | 2/2017 | Broomhall | G06F 17/2247 |

(Continued)

FOREIGN PATENT DOCUMENTS

KR    20040096821 A    11/2004

OTHER PUBLICATIONS

Sibley, Ben, "How to add a Favicon with WordPress", https://www.competethemes.com/blog/add-image-browser-tab-wordpress/, Retrieved on: Dec. 6, 2016, 6 pages.

(Continued)

*Primary Examiner* — Hua Lu
(74) *Attorney, Agent, or Firm* — Shook, Hardy & Bacon L.L.P.

(57) ABSTRACT

Systems and methods are provided for customizing tabs in a browser window by facilitating visual modifications to the tabs. An indication of a user interaction with a tab, such as a hover or selection input, is received. Based on receiving this indication of a user interaction, one or more options from which a user may select to modify or add content to the tab are provided for display. These options may include, for instance, colors, icons, text modifications, objects, etc. A user selection is received from the one or more options. Based on the user selection, the tab is visually altered.

20 Claims, 12 Drawing Sheets

(56) References Cited

U.S. PATENT DOCUMENTS

| | | | |
|---|---|---|---|
| 9,971,847 B2* | 5/2018 | Bhupatiraju | G06F 16/9577 |
| 2006/0244768 A1 | 11/2006 | Witwer | |
| 2007/0143701 A1* | 6/2007 | Iremonger | G06F 3/048 |
| | | | 715/777 |
| 2008/0040682 A1* | 2/2008 | Sorenson | G06F 3/04817 |
| | | | 715/777 |
| 2009/0327947 A1* | 12/2009 | Schreiner | G06F 3/0483 |
| | | | 715/777 |
| 2010/0198918 A1* | 8/2010 | Sundararajan | G06F 16/954 |
| | | | 709/205 |
| 2010/0241962 A1* | 9/2010 | Peterson | G06F 3/0481 |
| | | | 715/720 |
| 2011/0271217 A1* | 11/2011 | Cruz Moreno | G06F 3/0482 |
| | | | 715/765 |
| 2011/0314407 A1* | 12/2011 | Cruz Moreno | G06F 16/957 |
| | | | 715/777 |
| 2012/0240075 A1* | 9/2012 | Kim | G06F 3/0481 |
| | | | 715/776 |
| 2012/0278747 A1* | 11/2012 | Abraham | G06F 9/452 |
| | | | 715/771 |
| 2012/0331408 A1* | 12/2012 | Ainslie | G06F 16/954 |
| | | | 715/760 |
| 2013/0061160 A1 | 3/2013 | Tseng | |
| 2013/0067328 A1* | 3/2013 | Salyards | H04N 21/26258 |
| | | | 715/716 |
| 2014/0033080 A1 | 1/2014 | Tong et al. | |
| 2014/0164960 A1 | 6/2014 | Kuo et al. | |
| 2014/0173497 A1 | 6/2014 | Schreiner et al. | |
| 2014/0250390 A1* | 9/2014 | Holmes | G06F 3/04817 |
| | | | 715/760 |
| 2014/0304642 A1* | 10/2014 | Santos | G06F 16/48 |
| | | | 715/780 |
| 2015/0007093 A1* | 1/2015 | Kuscher | G06F 3/0481 |
| | | | 715/779 |
| 2015/0169505 A1* | 6/2015 | Kim | G06F 3/0484 |
| | | | 715/269 |
| 2015/0205462 A1 | 7/2015 | Jitkoff et al. | |
| 2016/0139750 A1 | 5/2016 | Barrus et al. | |
| 2016/0188138 A1* | 6/2016 | Chen | G06F 3/0483 |
| | | | 715/777 |
| 2017/0039172 A1* | 2/2017 | Broomhall | G06F 17/2247 |
| 2017/0270598 A1* | 9/2017 | Ram | G06Q 30/08 |

OTHER PUBLICATIONS

Dolske, Justin, "Add-ons", https://addons.mozilla.org/en-us/firefox/addon/chromatabs/?src=search, Published on: Apr. 3, 2007, 2 pages.

"chrome.browserAction", https://developerchrome.com/extensions/browserAction, Retrieved on: Dec. 6, 2016, 11 pages.

Kenton, "How to Customize the Title of Any Tab in Chrome [Tip] | dotTech", Retrieved from: https://dottech.org/173829/how-to-customize-the-title-of-any-tab-in-chrome-tip/print, Feb. 20, 2015, 2 Pages.

"TabRenamizer fur Firefox" Retrieved from: http://www.computerbild.de/download/TabRenamizer-fuer-Firefox-3970714.html, Feb. 16, 2016, 5 Pages.

"International Search Report and Written Opinion Issued in PCT Application No. PCT/US18/017732", dated Apr. 18, 2018, 23 Pages.

"How to Rename a Tab (Mozilla Firefox)", Retrieved from: https://www.youtube.com/watch?v=ENxueQrtzfc, Retrieved on: Mar. 20, 2018, 2 Pages.

* cited by examiner

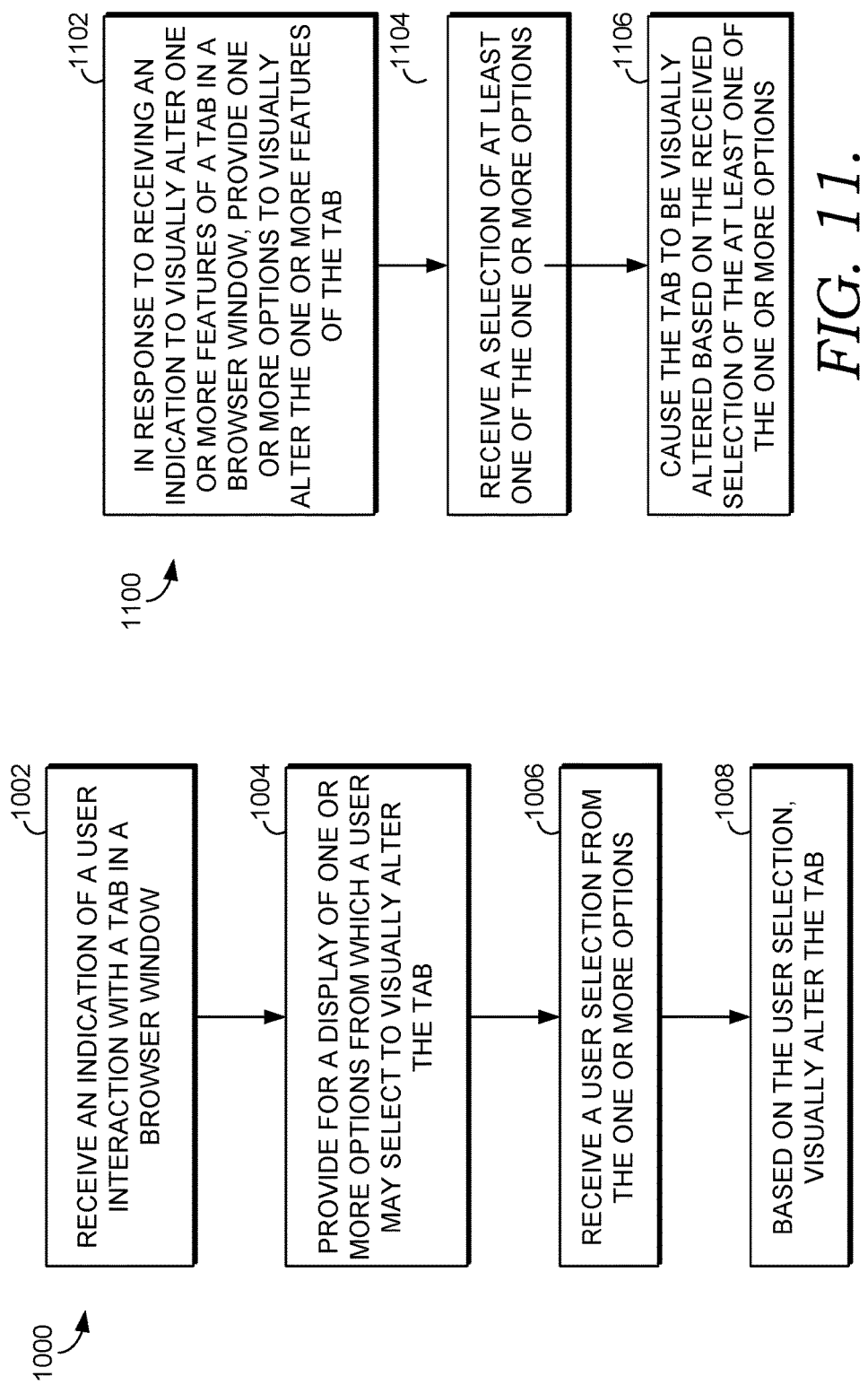

CUSTOMIZING TABS USING VISUAL MODIFICATIONS

BACKGROUND

In many cases, users of web browsers, such as on a personal computing device, have multiple webpages open at the same time, where each webpage may be associated with a tab. Each tab may include some identifying information about its associated webpage, such as some text and/or an icon. However, when there are multiple tabs that are simultaneously visible to the user, if the user is moving back and forth from one webpage to another, it may be frustrating to find the tab that the user is looking for. For instance, users may become overwhelmed with the number and type of tabs that are simultaneously open in a browser, and when unable to find a particular webpage by its associated tab, the user may proceed to open a new tab for a webpage that is already open in the browser. Content that a user would find helpful, however, when moving from tab to tab is typically not found on a tab.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Technology described in the present disclosure improves the user's experience when multiple webpages are open in one browser. Embodiments provided herein allow for a user to customize content in browser tabs, and allow for the customized content to persist, even when the webpage associated with a tab is closed by the user. For instance, a user may want to modify the text in a browser tab, or add coloring to the tab. Or, the user may wish to add some marking, such as a flag or earmark, which would indicate to the user that the particular tab is important, or that it is a tab the user wants to return to at a later time. These customization options may be provided to the user after a hover or selection input is received. When the user saves the link to the webpage associated with a tab having customized content, such as to a "favorites" folder, the customized content may persist in the "favorites" folder, being viewable to the user for retrieval at a later time.

BRIEF DESCRIPTION OF THE DRAWINGS

Aspects of the disclosure are described in detail below with reference to the attached drawing figures, wherein:

FIGS. 10-12 depict flow diagrams of methods for customizing tabs in a browser window by facilitating visual modifications to the tabs, in accordance with aspects of the present disclosure.

DETAILED DESCRIPTION

Figure 1:
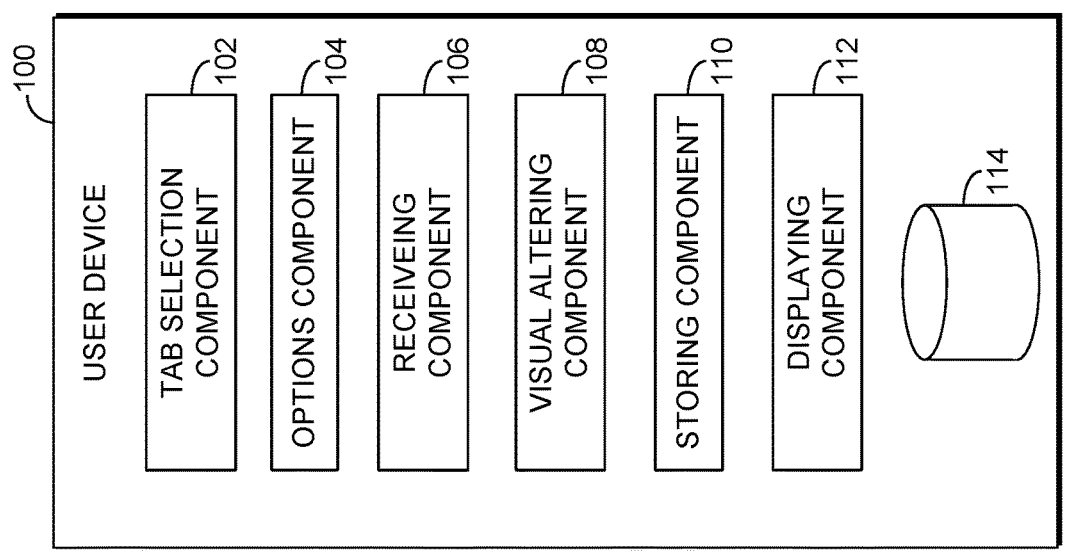
FIG. 1 is a block diagram of an exemplary user device suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Technology described in the present disclosure improves the user's experience when using a web browser, in particular when multiple webpages are open at the same time in a single web browser. For example, users typically have more than one webpage open at the same time in a single web browser. Each webpage has a browser tab that includes content that may identify the webpage associated with the tab, and therefore multiple tabs may be simultaneously visible to the user. A browser tab, also termed a tab, as used herein, refers to a navigational widget in a web browser that allows a user to move back and forth between webpages. As mentioned, tabs typically contain content that is meant to identify the webpage associated with the tab, and thus users rely on the content of the tabs to know which tab to select for a particular webpage. The content on the browser tabs, however, may be generic, and may not be useful to the user to identify the underlying webpage associated with the tab.

The problem of generic content in tabs has only become a problem for users since multiple webpages have been able to be opened in a single web browser. When just one webpage is opened in a web browser, the content on the tab is not particularly important, but instead only becomes important when used to identify a webpage. With multiple open webpages in a web browser, content in a tab becomes even more important to allow a user to seamlessly move back and forth between tabs.

Users, in embodiments herein, can "earmark" tabs by customizing them with a badge, adding an icon, renaming the title, or by changing the color of the tab. Often, users use tabs as a "to do" list, or keep tabs open to come back to at a later time. The webpage-specified title and favicon, however, is sometimes generic and does not provide enough information for a user to remember what the tab means to him/her personally. It also provides a lower barrier to entry and a less permanent feel to the user than the existing "favorites" feature included in many web browsers, which many users either file-and-forget or ignore entirely.

The technical solution to address this technical problem, using embodiments herein, is to provide customization options to the user. When a user customizes content in a tab, the user is more likely to remember the content of the webpage associated with the tab. For instance, in one embodiment, the user may have the option to add color to a tab. The user, upon hovering, selecting, etc., a particular tab, may be presented with customization options. These options could include two or more colors from which the user could select. The color, once chose, could be displayed inside the tab. The user could choose a color that is meaningful to the user, such as the color red for shopping webpages, purple for social media webpages, yellow for to-do webpages, etc. Once a color is selected, the tab will visually reflect that color. The color could be applied to the tab is any way, including underlining the title or other text in the tab, a full tab highlight, a color behind a favicon, or the like. In embodiments, if the URL or link associated with the tab is saved as a "favorite" for the user, the user-selected color or other customized tab content persists in the "favorites" area or folder of the web browser. This would assist the user in locating a particular webpage in the future, based on the user's own content customization.

Other examples of tab content customization include modifying the text in a tab. For instance, the user could select (e.g., double click) on a tab's title to get a text edit box. The user could then enter in a more meaningful title for the webpage, which would then be reflected in the tab. Again, if this webpage is saved as a favorite for the user, the renamed title of the tab or other modified text of the tab could persist into the "favorites" view or folder of the web browser.

Earmarking tabs is another way for a user to be able to identify one tab from another. The user, for example, may want to mark a tab as being of particular importance for any reason. In one embodiment, when the user hovers a cursor over a tab, an "earmark" hover state could be present, showing the user that he/she could quickly put an earmark (or any other object) on the tab to identify it from others. With a click, the earmark would be added to the tab, making it visually pop from the other tabs and making it easy to return to for the user. While an earmark is discussed herein, any object (e.g., flag, icon, shape) could be used to identify one tab from another. In fact, icons/images/object that identify the purpose of the webpage associated with the tab could be used. For example, shopping webpages could have a shopping cart image on the tab, while informational webpages could have a light bulb image on the tab. The user is able to choose the objects added to the tabs so that the content of the tab is customized to the particular user. Again, if the webpage is saved to the user's "favorites" folder, the earmark or other object could also be visible to the user in that location as well. While saving links to webpages to a "favorites" folder is discussed herein, the link to the webpage could be saved anywhere on the computing device, such as in a roaming folder, browser search history, etc.

In aspects, once the user has customized tabs, the user may be able to group tabs based on some criteria, such as by color, domain, or manually. For example, all tabs with purple coloring could be grouped together and all tabs with orange coloring could be grouped together. Advantageously, with the customization options being built into a browser application user interface, the user is provided with a deeper, more customized experience than some other alternative solutions, which are merely add-on extensions that are not built in to a web browser application.

In one aspect, a method is provided for customizing tabs in a browser window by facilitating visual modifications to the tabs. The method includes receiving an indication of a user interaction with a tab of the one or more tabs in the browser window, and based on receiving the indication of the user interaction, providing for a display of one or more options from which a user may select, the one or more options visually altering the tab of the one or more tabs. Further, the method includes receiving a user selection from the one or more options, and based on the user selection, visually altering the tab.

In another aspect, one or more computer storage media are provided having computer-executable instructions embodied thereon, which, when executed by a computing device, cause the computing device to perform a method of customizing tabs in a browser window by facilitating visual modifications to the tabs. The method comprises, in response to receiving an indication to visually alter one or more features of a tab in a browser window, providing one or more options that, when selected, would visually alter the one or more features of the tab, and receiving a selection of at least one of the one or more options to visually alter the one or more features of the tab. Also, the method comprises causing the tab to be visually altered based on the received selection of the at least one of the one or more options. Causing the tab to be visually altering comprises one or more of modifying original content that was on the tab prior to the visual alteration, or adding new content to the tab.

In yet another aspect, a computer-implemented method is provided for customizing tabs in a browser window by facilitating visual modifications to the tabs. The method comprises, in response to receiving an indication to visually alter one or more features of a tab in a browser window of a computing device, providing one or more options that, when selected, would visually alter the one or more features of the tab. Further, the method comprises receiving a selection of at least one of the one or more options to visually alter the one or more features of the tab, and causing the tab to be visually altered based on the received selection of the at least one of the one or more options. Causing the tab to be visually altered comprises modifying original content on the tab or adding new content to the tab. The method additionally comprises receiving an indication that a link to a webpage associated with the tab is to be saved on the computing device and storing the link to the webpage associated with the tab on the computing device along with at least one of the modifications to the original content or the new content.

Turning now to FIG. 1, a block diagram is provided showing an exemplary user device 100 in which some aspects of the present disclosure may be employed. It should be understood that this user device 100 described herein is set forth only as an example. Other arrangements components of the user device 100 can be used in addition to or instead of those shown, and some components may be omitted altogether for the sake of clarity. Further, many of the components described herein are functional entities that may be implemented as discrete or distributed components or in conjunction with other components, and in any suitable combination and location. While all components are illustrated as being part of the user device 100, in some embodiments, some or all of these components may be a part of the server side, and as such would not be performed by the user device 100. Various functions described herein as being performed by one or more entities may be carried out by hardware, firmware, and/or software. For instance, some functions may be carried out by a processor executing instructions stored in memory.

Among other components not shown, user device 100 includes a tab selection component 102, an options component 104, a receiving component 106, a visually altering component 108, a storing component 110, and a displaying component 112. Additionally, user device 100 comprises a data store 114. User device 100, in embodiments, is a client user device on the client-side of an operating environment, which could include servers, for instance, and other server side components. User device 100 may comprise any type of computing device capable of use by a user. For example, in one aspect, user device 100 may be the type of computing device described in relation to FIG. 13 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

The tab selection component 102 is generally responsible for determining which tab the user wants to visually modify. In some embodiments, a user of the computing device may have caused more than one tab to be visible or otherwise available at a given time. This could be caused, for example, by the user having multiple webpages open in a browser or in multiple browsers, where each tab may be associated with an open webpage. As such, a user may provide the user device 100 with a selection of a particular tab, and the tab selection component 102 may then use that selection determine that the particular tab is to be visually altered in some way.

The options component 104 generally provides options to the user for visually modifying the tab. The options component 104, for example, could make a determination as to which options to provide to the user based on the application associated with the tab, recent options selections by the user, etc. The options provided by the options component 104 could include, for exemplary purposes only and not limitation, underlining colors, text or icon highlighting colors, tab colors, earmarks, text modifications, or the like. Once options are provided by the options component 104, the receiving component 106 is responsible for receiving option selections made by the user.

Once the options selections have been received, the visual altering component 108 makes the visual modifications to the tab. For instance, if the user selected the color purple for underlining text in the tab, the visual altering component 108 adds purple underlining to the tab. Or, if the user selected the addition of an earmark to the tab, the visual altering component 108 adds an earmark to the tab. Any visual alterations made by the visual altering component 108 provide customization and personalization to the tab, and provide the advantage of allowing the user to organize his or her tabs.

The storing component 110 stores information, which could include links to webpages and content from tabs, including added content or modified content. This information, in embodiments, is stored in the data store 114. Data store 114 is illustrated as being on the user device 100, but in certain embodiments, could be located separately from the user device 100. In one embodiment, a user may desire for a link to a webpage associated with a particular tab be stored, such as in a "favorites" folder that can be accessed in the future to return to that webpage. In embodiments herein, not only would the link and a title be stored, but also any modified or added content that the user has included for customization of the tab. For example, if the user chose to add a particular color to the tab, that added color content could be stored on the user device 100 and even could be made to be visible on the user device 100. For instance, in a "favorites" folder, the added color could be visible at that location so that the user's customization of the tab would persist from the tab to the "favorites" folder.

The displaying component 112 communicates information for display on the user interface of the computing device 100. For example, once the visual altering component 108 makes the modifications or additions to the tab, the displaying component 112 is responsible for providing these changes to the user interface for display to the user. The displaying component 112 may also be responsible for displaying the tabs in a particular order. For instance, once the user has customized the tabs in a web browser, the user may be able to group tabs based on some criteria, such as by color, domain, or manually. Once organized, the displaying component 112 would display the tabs in the order specified by the user. For example, in an embodiment, a user may be provided with options for sorting or grouping tabs. The groupings could be based on any feature of the tabs, including color. Once the user has provided input as to the sorting or grouping of the tabs, the tabs could be reordered as specified by the user.

Figure 2:
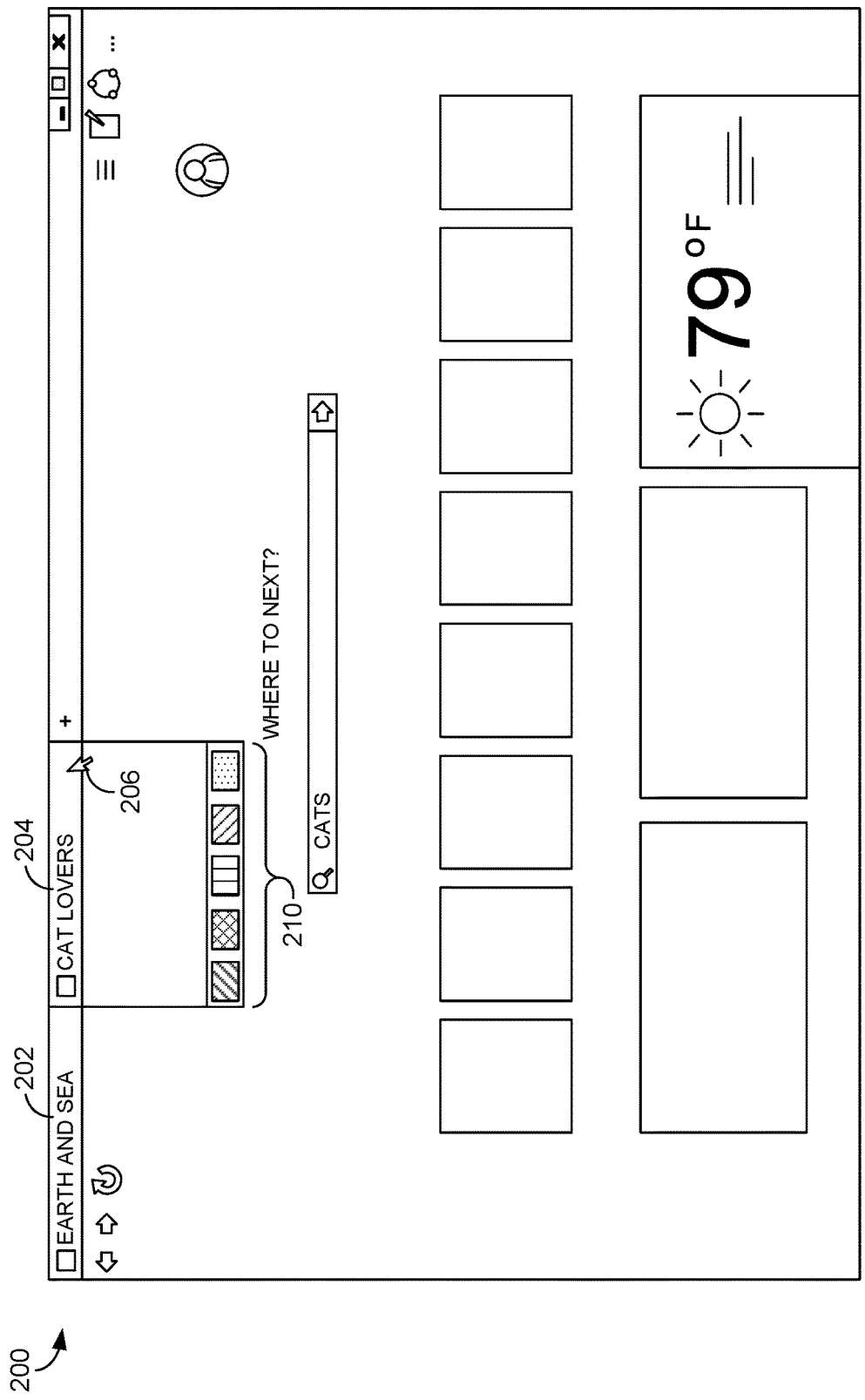
FIGS. 2-4 depict screenshots of visually modifying a tab by adding color or patterns to the tab, in accordance with aspects of the present disclosure.
Figure 3:
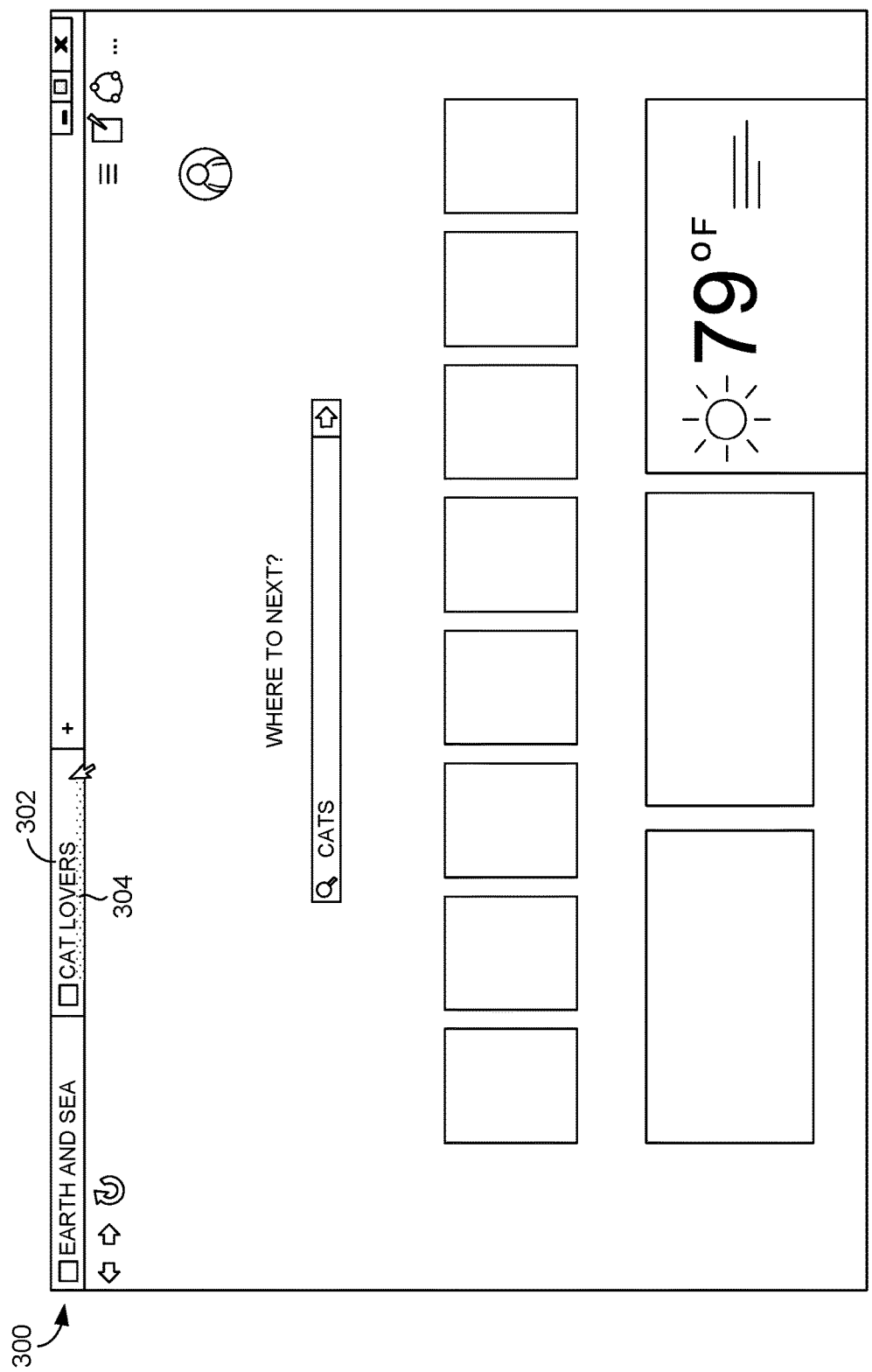
Figure 4:
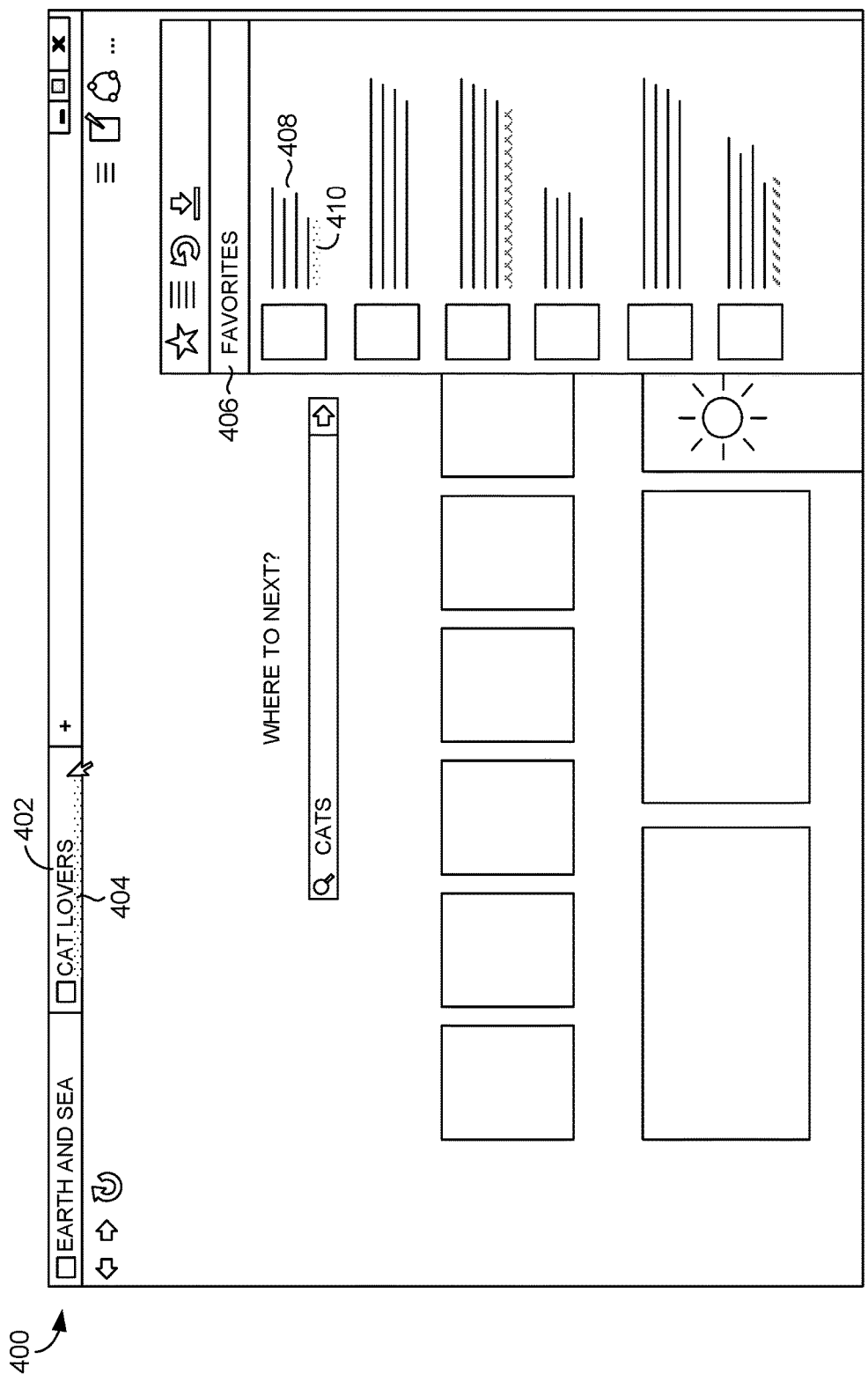

FIGS. 2-4 depict screenshots of visually modifying a tab by adding color or patterns to the tab, in accordance with aspects of the present disclosure. FIG. 2 illustrates a screenshot 200 of a web browser having two tabs (202 and 204). Tab 204 is currently selected by a user, as indicated by cursor 206. The user, in one instance, may hover over tab 204 to initiate a presentation of customization options, or in alternative embodiments may select the tab, such as by clicking on the tab using a mouse or other device. The customization options 208 presented in FIG. 2 include multiple different colors (item 210) (depicted in FIG. 2 as different patterns to represent colors) from which the user may select. These colors, when added to tab 204, could be added as an underline, highlight, full tab coloring, etc.

FIG. 3 is a screenshot 300 depicting a color option having been selected by a user, where the color is added to tab 302 as an underline 304 of text. FIG. 4 illustrates a screenshot 400 depicting the user adding the link to the webpage associated with tab 402 to a "favorites" folder 406. As illustrated, the underlining color 404 is still visible in the tab, and is also made visible in the "favorites" folder 406, shown as item 410 for saved link 408. In some embodiments, a "favorites" folder 406 may be easily accessible on a web browser to provide a user with easy and quick access to favorite webpages. While typically, the information saved in a "favorites" folder 406 accessibly on a web browser including only the default information of the webpage (e.g., link, title), here, additional or modified content of a tab may also be saved. For example, if a user added purple color to a tab to signify the tab was educational, that purple color persisting in the "favorites" folder would continue to signify to the user that the saved link is educations. The same could be done with social media sites, children's sites, work-related sites, etc.

Figure 5:
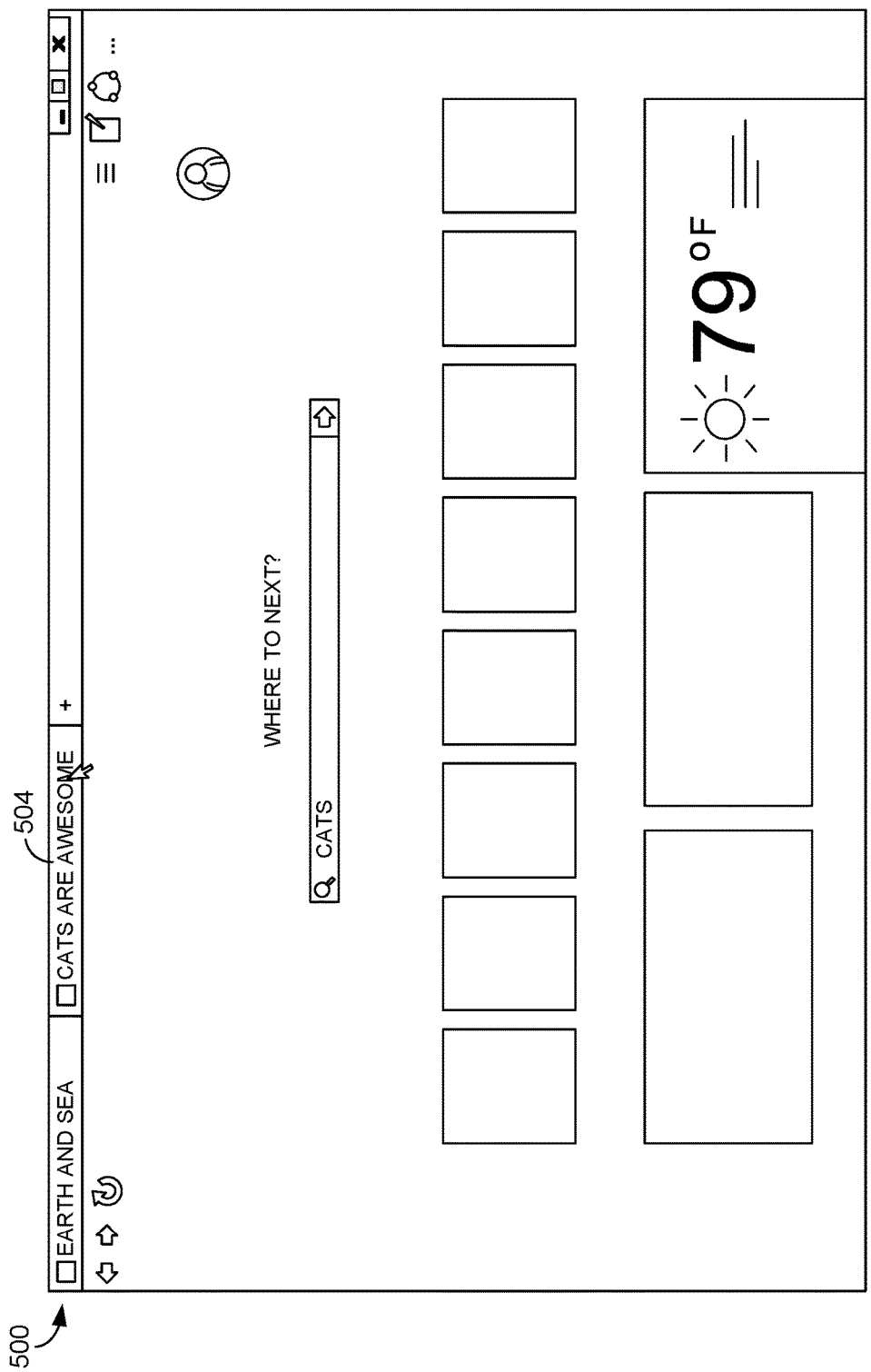
FIGS. 5-6 depict screenshots of visually modifying a tab by modifying text on the tab, in accordance with aspects of the present disclosure.
Figure 6:
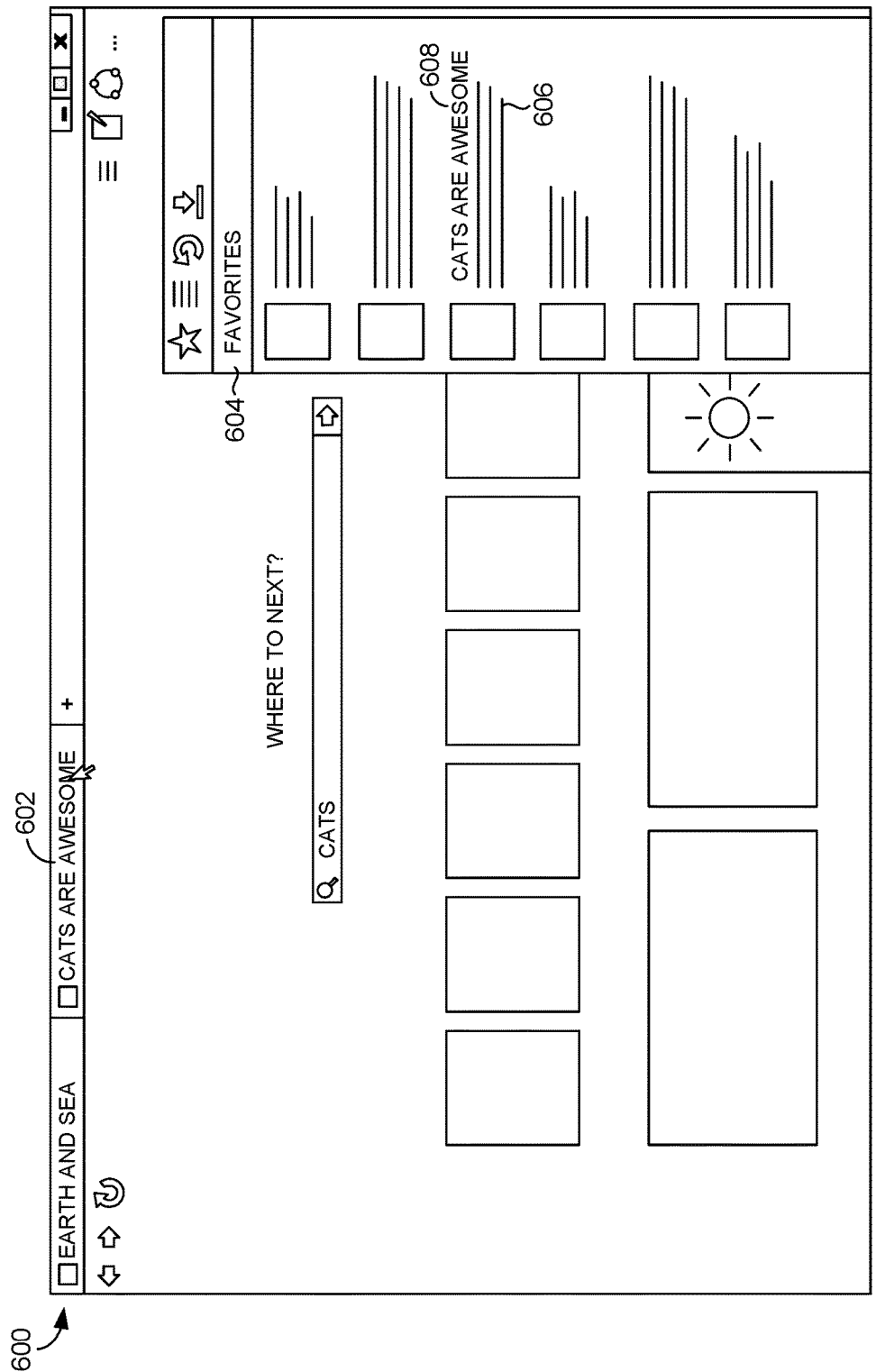

FIGS. 5-6 depict screenshots of visually modifying a tab by modifying text on the tab, in accordance with aspects of the present disclosure. FIG. 5 illustrates a screenshot 500 where the user has modified the original text of tab 502. Original text "cat lovers" may have come directly from the webpage associated with tab 502. The user, however, in order to customize the tab to assist the user in remembering the content of the webpage, has changed the text to "cats are awesome." In the screenshot 600 of FIG. 6, the tab still includes the text "cats are awesome," but there, the user also saved the link to the webpage associated with tab 602 to a "favorites" folder 604. The saved link and content (item 606) includes the modified content of "cats are awesome"

(item 608) in the "favorites" folder 604. Allowing the customized content from the tab to persist in the "favorites" folder 604 allows a user to organize and customize information from tabs into the "favorites" folder 604. The advantage of this is so the user can continue to use the customized content to remember and understand the user's reasons for saving the link to the webpage, to remember content on the webpage, etc.

Figure 7:
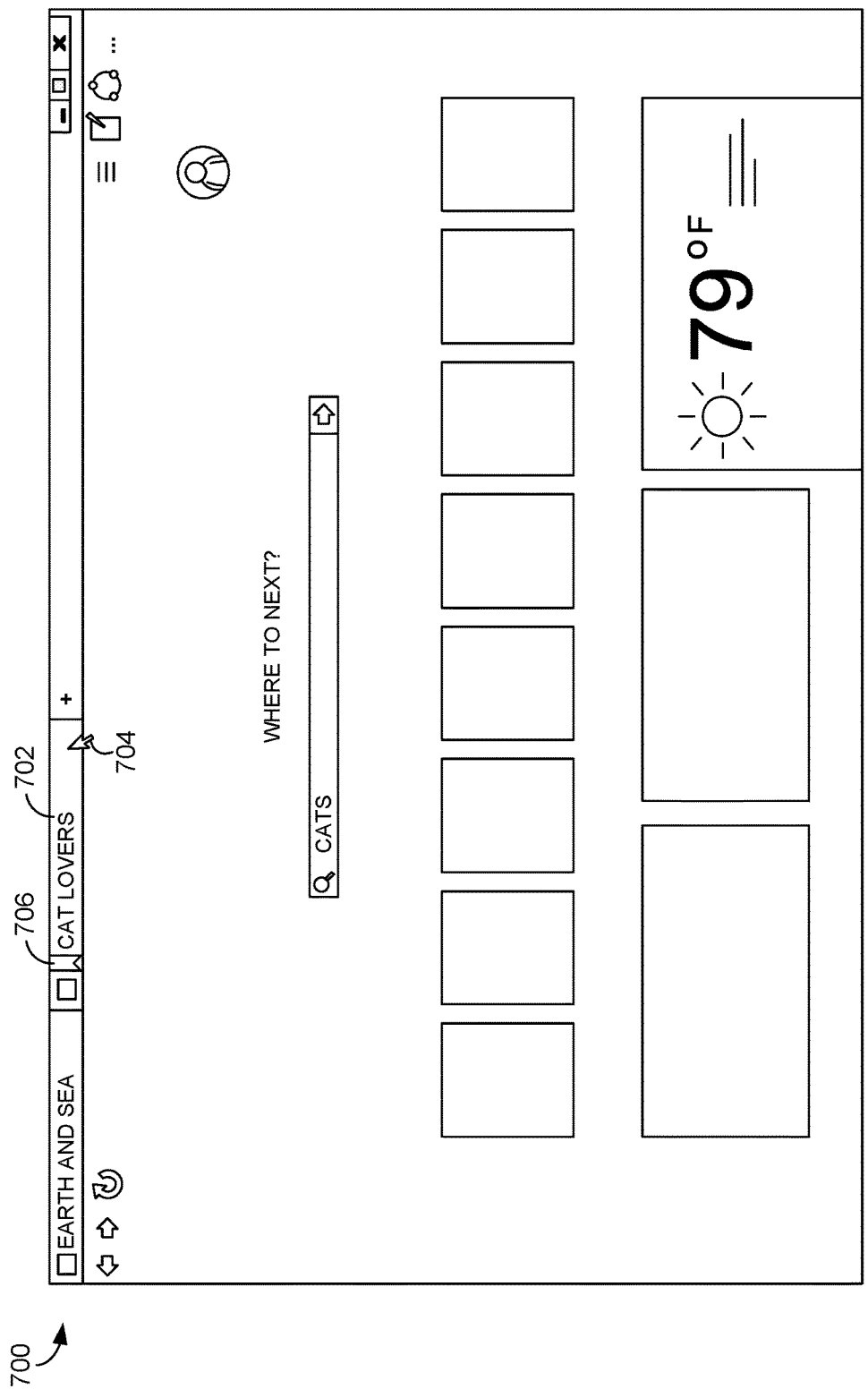
FIGS. 7-9 depict screenshots of visually modifying a tab by adding content to the tab, in accordance with aspects of the present disclosure.
Figure 8:
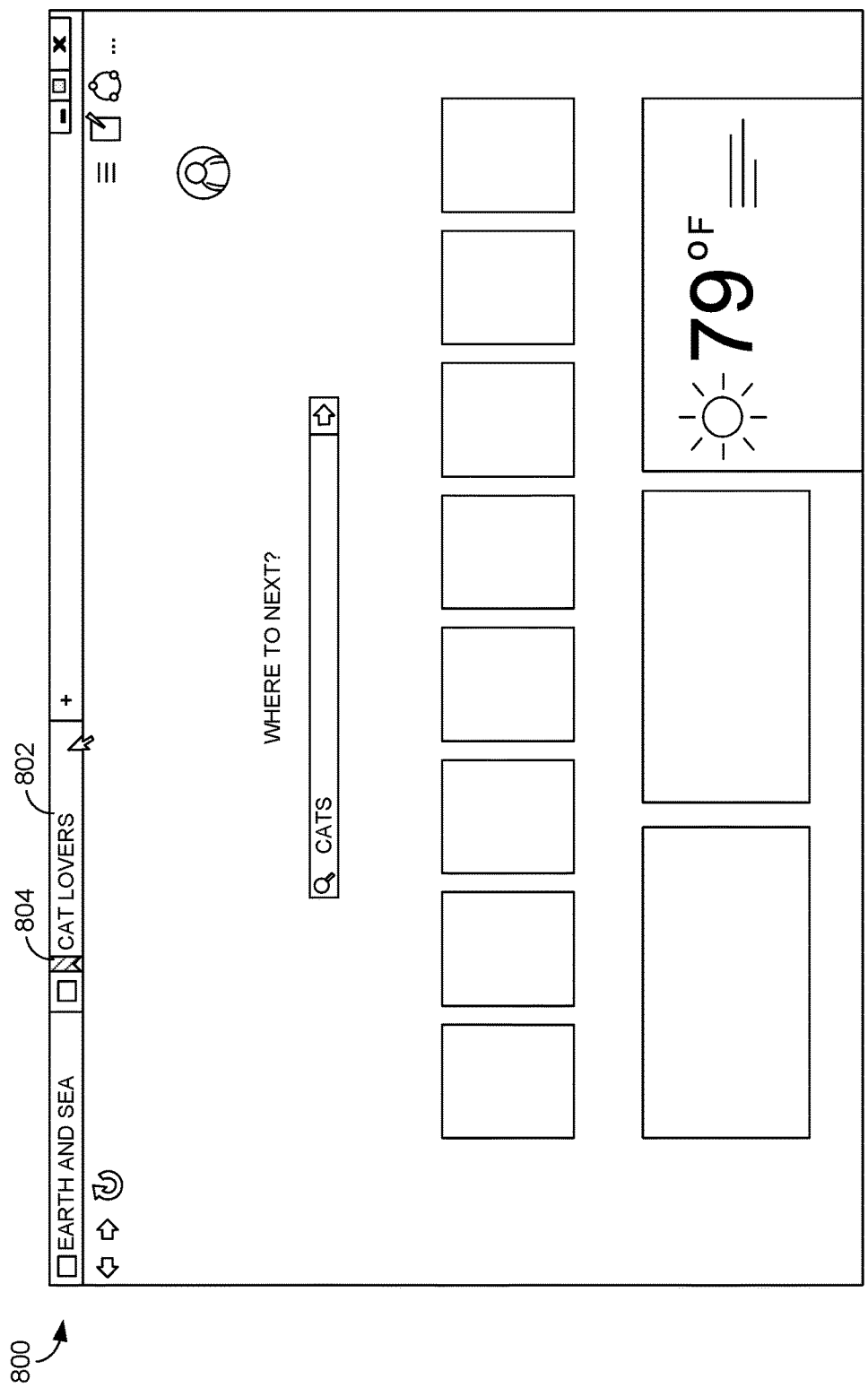
Figure 9:
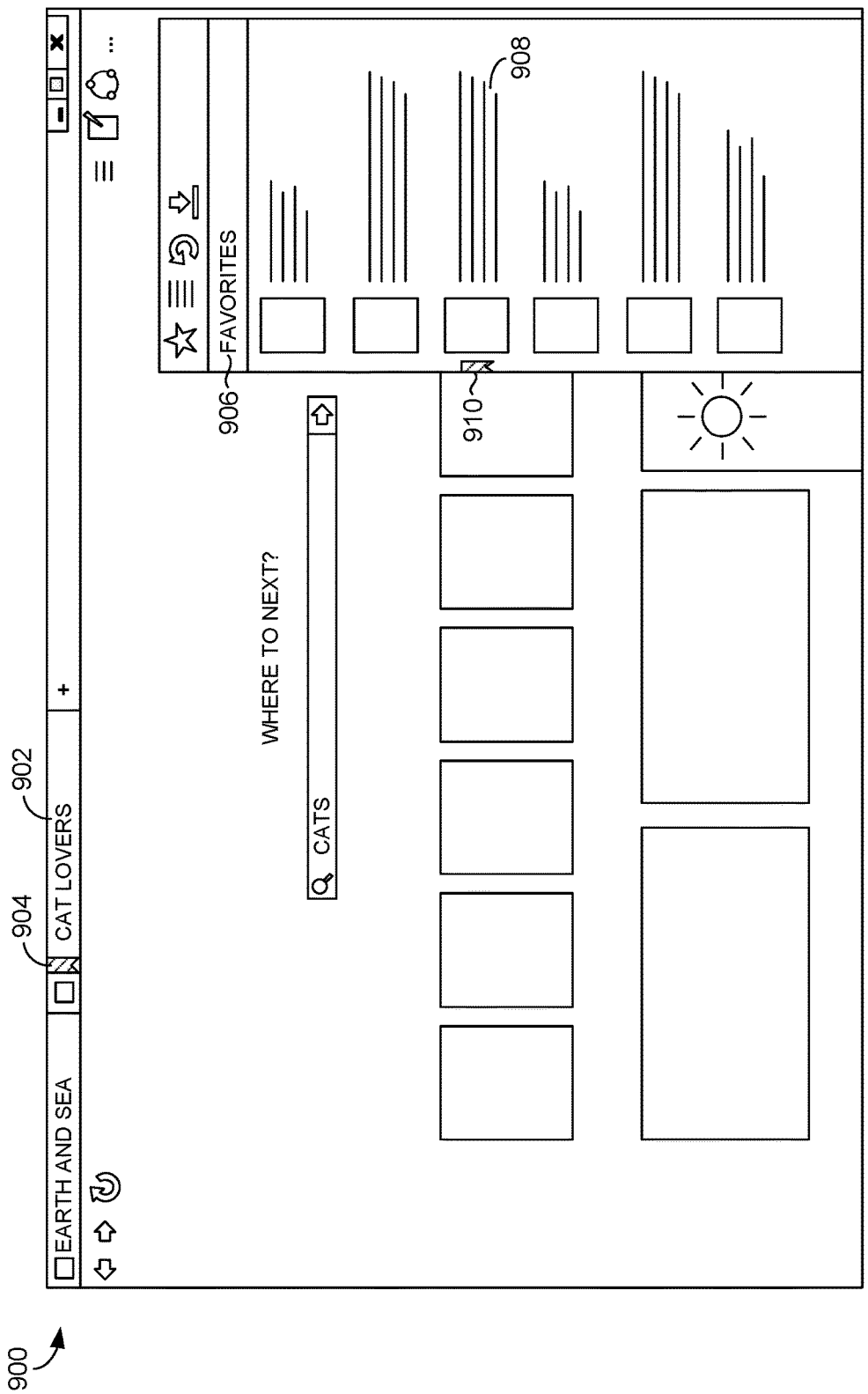

FIGS. 7-9 depict screenshots of visually modifying a tab by adding content to the tab, in accordance with aspects of the present disclosure. FIG. 7 illustrates a screenshot 700 that comprises a tab 702 with a cursor 704 on the tab 702. The cursor 704 could be hovering over the tab 702 or the user could select (e.g., click, point, touch) the tab 702 using the cursor 704 or any other device or object, including a finger, a pen, etc. As illustrated on tab 702, once a user input, such as a hover or selectin of tab 702, has been received by the user device, a flag or earmark 706 may appear on the user interface. In embodiments, the user may select what type of mark or additional content is added to the tab. An earmark 706 is illustrated in FIG. 700 as just one example of new content added to a tab, but the new content can be anything, including a shape, an icon, a picture, lines, etc. FIG. 8 illustrates a screenshot 800 having a tab 802 with an earmark 804 that has been selected by the user to visually appear on the tab 802. This is an example of new content on a tab 802. FIG. 9 illustrates a screenshot 900 with tab 902 and earmark 904. Here, the user has opted to save a link to the webpage associated with tab 902 to a "favorites" folder 906. This folder can have any name, but in one embodiment, is accessible to the user by way of a web browser. In some instances, an icon appears on the user interface of a web browser that allows a user to select a link to a previously-saved webpage. In embodiments, the link and content from the tab are stored. Here, modified content and new content added by the user to customize the tab 902 may also be saved in the "favorites" folder 906. As shown, an earmark 910, being new content, persists from the tab 902 to the "favorites" folder 906, along with the link to the webpage 908. Any other type of new content or modified content on a tab, such as tab 902, may persist and be visible to the user when a link to a webpage associated with the tab 902 is saved to a folder or elsewhere on the computing device.

FIG. 10 depicts a flow diagram of a method 1000 for customizing tabs in a browser window by facilitating visual modifications to the tabs, in accordance with an aspect of the present disclosure. Initially, at block 1002, an indication is received of a user interaction with a tab in a browser window. The indication, in embodiments, may be a hover action over the tab, or could be a selection of the tab, such as by a click or touch action. At block 1004, a display is provided for one or more options from which a user may select to visually alter the tab. Visually altering the tab, in embodiments, comprises modifying original content that was on the tab prior to the visual alteration, or adding new content to the tab. For instance, modifying text on the tab would be a modification of original content, and adding a flag, earmark, icon, coloring, etc., to the tab would be new content. The options provided to the user on a user interface could include, for instance, one or more colors from which the user may select. The color could be added to any portion or all of the tab, such as an underline, a highlight, etc. In this instance, when a color is selected by the user, the selected color is added to at least a portion of the tab. At block 1006, a user selection of the one or more options is received. At block 1008, based on the user selection, the tab is visually altered.

In embodiments, an indication is received that a link to a webpage associated with the tab is to be saved in a folder on the computing device. In some instances, the link is saved to a "favorites" folder, which is accessible on the web browser. The link to the webpage is stored with content from the tab. The content from the tab that is stored may include any modified content and/or added content which the user has added to create a customized tab for that user. In addition to being stored, this content may be visible to the user in a folder, such as a "favorites" folder, for future access. Thus, this allows the customized content added by the user to persist from the tab to being stored in a folder on the user's device. This is advantageous for the user, as the customized content is not lost when a webpage is closed, as it is saved on the user's device. In embodiments, when the user reopens the same webpage via a folder, such as a "favorites" folder, the customized content added or modified by the user appears on the tab. This means that the user does not have to re-customized the tab's content the next time the webpage associated with the tab is opened.

FIG. 11 depicts another flow diagram of a method 1100 for customizing tabs in a browser window by facilitating visual modifications to the tabs, in accordance with an aspect of the present disclosure. At block 1102, in response to receiving an indication to visually alter one or more features (e.g., text, icons, colors) of a tab in a browser window, such as by a hover or selection input, options are provided that, when selected, would visually alter the features of the tab. Features, as used herein, include any attributes or aspect of a tab, which may include, for exemplary purposes only, text, icons, shapes, color, and the like. At block 1104, a selection is received, such as from a user of the computing device, of at least one of the provided options. At block 1106, the tab is caused to be visually altered based on the received selection of the provided options. In an embodiment, causing the tab to be visually altered may include modifying original content (e.g., modifying text) that was on the tab prior to the visual alteration, and/or adding new content to the tab.

As mentioned above in regards to FIG. 10, a user may wish to save the link to the webpage associated with the tab for future retrieval. In this case, the link to the webpage associated with the tab may be stored for future access. Along with the link, content from the tab may also be stored. In embodiments, content that has been modified from the original tab content or new content may also be stored. This is illustrated in FIGS. 4, 6, and 9 herein.

Figure 12:
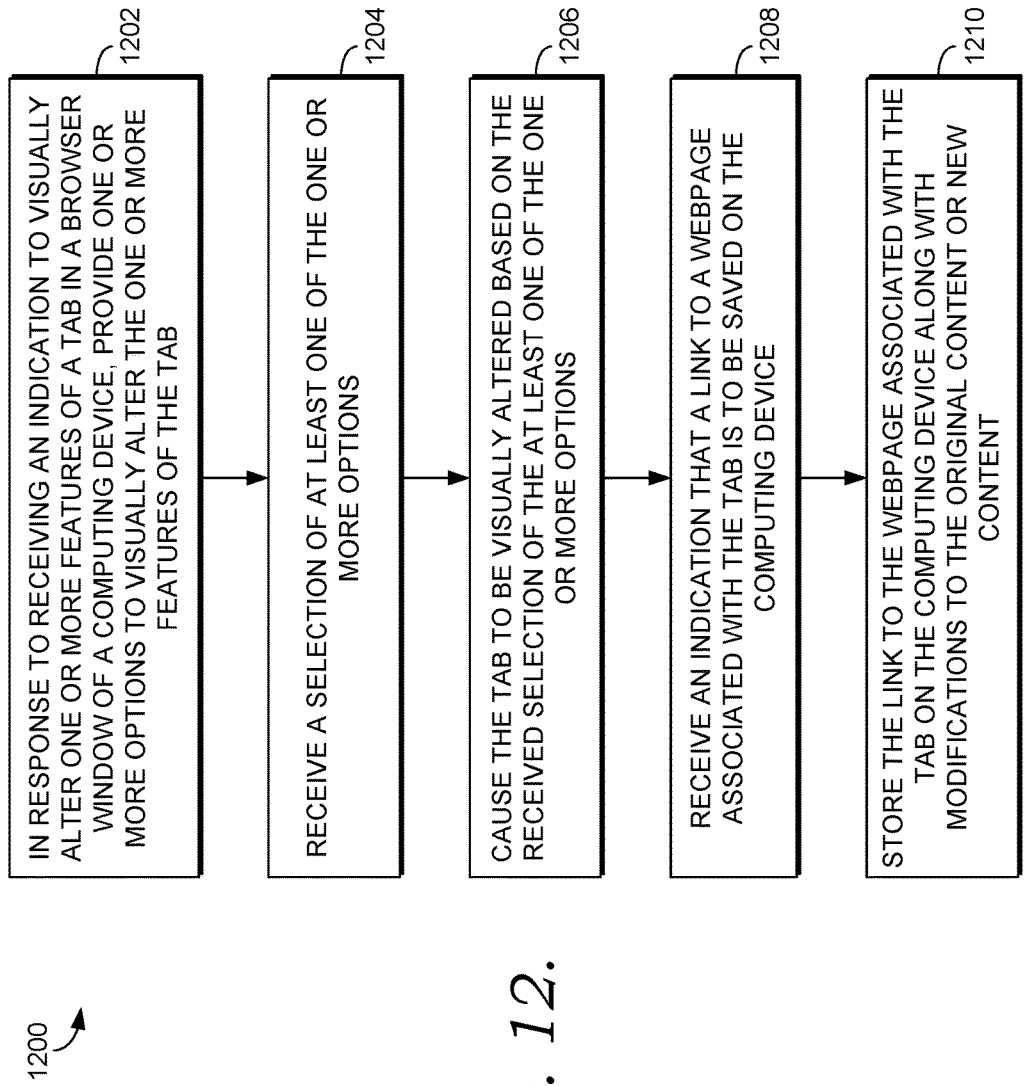

Turning now to FIG. 12, another flow diagram is depicted of a method 1200 for customizing tabs in a browser window by facilitating visual modifications to the tabs, in accordance with an aspect of the present disclosure. Initially at block 1202, in response to an indication being received to visually alter features of a tab in a browser window of a computing device, options are provided to visually alter the features of the tab. For instance, in response to receive an indication of a cursor hovering over the tab or a user selecting (e.g., by way of a mouse, pen, finger) the tab, the computing device may provide one or more options that can be selected by the user to customize that, which visually alters content on the tab. At block 1204, a selection is received of at least one of the provided options. At block 1206, the tab is caused to be visually altered based on the received selection of the at least one option. Causing the tab to be visually altered, in one embodiment, comprises modifying original content (e.g., modifying text) on the tab or adding new content (e.g., color, earmark, icon, image) to the tab. At block 1208, an indication is received that a link to a webpage associated with the tab is to be saved on the computing device. The link to the webpage associated with the tab is stored, at block 1210, on the computing device along with at least one of the modifications to the original content or the new content.

Figure 13:
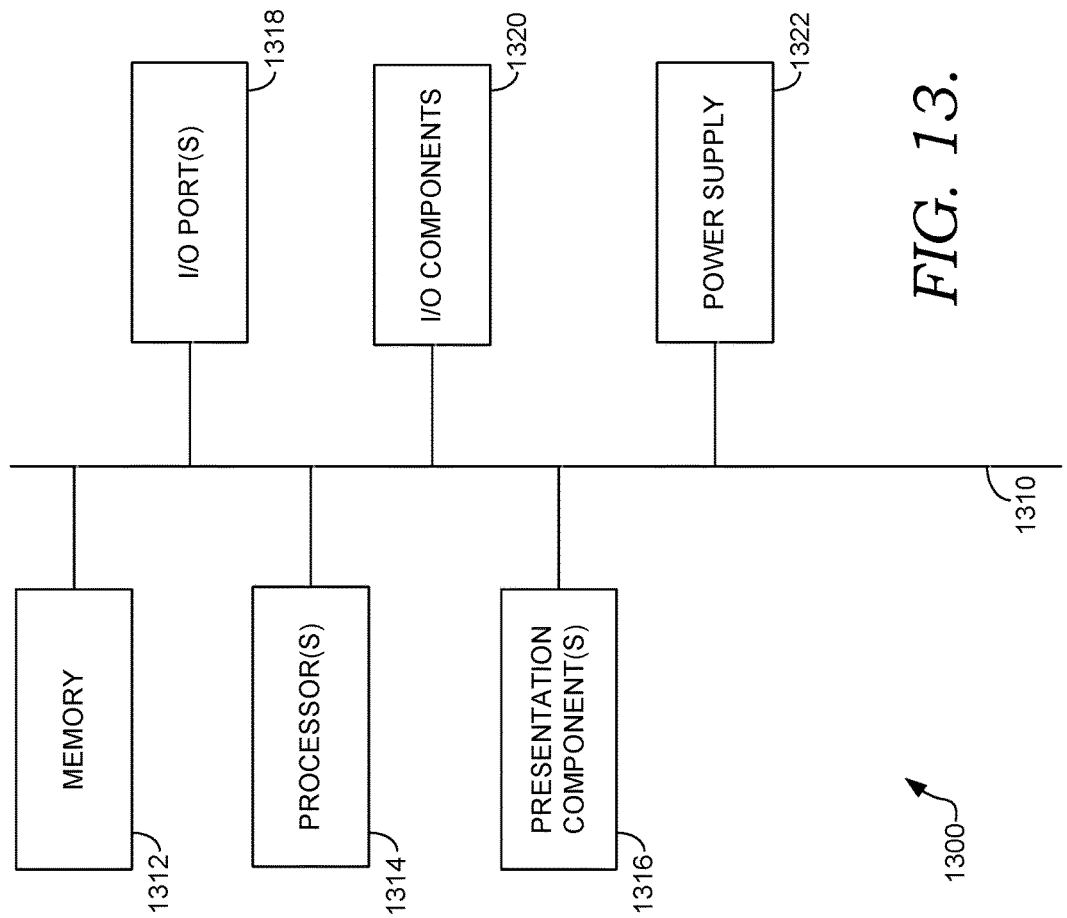
FIG. 13 is a block diagram of an exemplary computing environment suitable for use in implementing an aspect of the present disclosure.

Having described various implementations, an exemplary computing environment suitable for implementing aspects of the disclosure is now described. With reference to FIG. 13, an exemplary computing device is provided and referred to generally as computing device 1300. The computing device 1300 is but one example of a suitable computing environment and is not intended to suggest any limitation as to the scope of use or functionality of aspects of the disclosure. Neither should the computing device 1300 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 13, computing device 1300 includes a bus 1310 that directly or indirectly couples the following devices: memory 1312, one or more processors 1314, one or more presentation components 1316, one or more input/output (I/O) ports 1318, one or more I/O components 1320, and an illustrative power supply 1322. Bus 1310 represents what may be one or more busses (such as an address bus, data bus, or combination thereof). Although the various blocks of FIG. 13 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 13 and with reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors 1314 that read data from various entities such as memory 1312 or I/O components 1320. Presentation component(s) 1316 presents data indications to a user or other device. Exemplary presentation components include a display device, speaker, printing component, vibrating component, and the like.

The I/O ports 1318 allow computing device 1300 to be logically coupled to other devices, including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

Some aspects of computing device 1300 may include one or more radio(s) 1324 (or similar wireless communication components). The radio 1324 transmits and receives radio or wireless communications. The computing device 1300 may be a wireless terminal adapted to receive communications and media over various wireless networks. Computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of customizing tabs in a browser window by facilitating visual modifications to the tabs, the method comprising:
   receiving an indication of a user interaction with a tab of the one or more tabs in the browser window, wherein the tab is selectable to display a webpage associated with the tab;
   directly in response to receiving the indication of the user interaction, providing for a display of one or more options from which a user may select, the one or more options visually altering the tab of the one or more tabs;
   receiving a user selection from the one or more options;
   based on the user selection, visually altering the tab to create modified content or new content; and
   storing the modified content or new content of the tab in association with a link to the webpage associated with the tab such that the modified content or the new content is displayed on the tab each time the webpage associated with the tab is accessed.

2. The method of claim 1, where visually altering the tab comprises one or more of:
   (1) modifying original content that was on the tab prior to the visual alteration, or
   (2) adding new content to the tab.

3. The method of claim 2, further comprising:
   receiving an indication that a link to a webpage associated with the tab is to be saved in a folder on a computing device; and
   storing the link to the webpage and content from the tab.

4. The method of claim 3, wherein the content stored is at least one of the modified original content or the new content.

5. The method of claim 3, wherein at least a portion of the content that is stored is visually altered content.

6. The method of claim 1, wherein the user interaction is a hover action or a selection.

7. The method of claim 1, wherein the one or more options comprise one or more colors from which the user may select.

8. The method of claim 7, further comprising:
   receiving a selection of one of the one or more colors; and
   adding the selected color to at least a portion of the tab.

9. The method of claim 8, wherein the selected color is added to an entirety of the tab, as an underline to at least a portion of any alphanumeric characters on the tab, or as a highlight to the alphanumeric characters on the tab.

10. The method of claim 1, wherein the one or more options comprise an earmark on the tab.

11. One or more computer storage media having computer-executable instructions embodied thereon, which, when executed by a computing device, cause the computing device to perform a method of customizing tabs in a browser window by facilitating visual modifications to the tabs, the method comprising:
    in response to receiving an indication to visually alter one or more features of a tab in a browser window, providing one or more options that, when selected, would visually alter the one or more features of the tab, wherein the tab is selectable to display a webpage associated with the tab;
    receiving a selection of at least one of the one or more options to visually alter the one or more features of the tab;
    causing the tab to be visually altered based on the received selection of the at least one of the one or more options, wherein causing the tab to be visually altering comprises one or more of:
    (1) modifying original content that was on the tab prior to the visual alteration, or
    (2) adding new content to the tab; and
    storing the modified content or new content on the tab in association with a link to the webpage associated with the tab such that the modified content or new content is displayed on the tab each time the webpage associated with the tab is accessed.

12. The media of claim 11, wherein the indication to visually alter the one or more features of the tab is a hover action or a selection of the tab.

13. The media of claim 11, wherein at least a portion of the original content that is modified is text.

14. The media of claim 11, wherein the new content is an earmark or other marking on the tab.

15. The media of claim 11, wherein the new content is a highlight or an underline on the tab.

16. The media of claim 11, wherein the one or more options include one or more colors that can be added to the tab.

17. The media of claim 11, further comprising:
    receiving an indication that a link to a webpage corresponding to the tab is to be stored for future access;
    storing the link to the webpage corresponding to the tab; and
    storing content from the tab including any modifications to the original content or the new content.

18. The media of claim 11, wherein modifying the original content comprises modifying text in the tab according to input by a user.

19. A computer-implemented method of customizing tabs in a browser window by facilitating visual modifications to the tabs, the method comprising:
    in response to receiving an indication to visually alter one or more features of a tab in a browser window of a computing device, providing one or more options that, when selected, would visually alter the one or more features of the tab, wherein the tab is selectable to display a webpage associated with the tab;

receiving a selection of at least one of the one or more options to visually alter the one or more features of the tab;

causing the tab to be visually altered based on the received selection of the at least one of the one or more options, wherein causing the tab to be visually altered comprises modifying original content on the tab or adding new content to the tab;

receiving an indication that a link to the webpage associated with the tab is to be saved on the computing device; and storing the link to the webpage associated with the tab on the computing device along with at least one of the modifications to the original content or the new content such that the at least one of the modifications to the tab can be retrieved from storage and displayed in the tab when the webpage is opened.

20. The method of claim 19, wherein the new content is one or more of an earmark or a color added to the tab.

* * * * *